US008961286B2

(12) United States Patent
Rumpler

(10) Patent No.: US 8,961,286 B2
(45) Date of Patent: Feb. 24, 2015

(54) METHOD AND DEVICE FOR HARVESTING THRESHED CROPS

(76) Inventor: Johann Rumpler, Dessau-Rosslau (DE)

( * ) Notice: Subject to any disclaimer, the term of this patent is extended or adjusted under 35 U.S.C. 154(b) by 252 days.

(21) Appl. No.: 13/389,384

(22) PCT Filed: Mar. 18, 2011

(86) PCT No.: PCT/DE2011/000281

§ 371 (c)(1), (2), (4) Date: Feb. 7, 2012

(87) PCT Pub. No.: WO2011/113426

PCT Pub. Date: Sep. 22, 2011

(65) Prior Publication Data

US 2012/0324853 A1 Dec. 27, 2012

(30) Foreign Application Priority Data

Mar. 19, 2010 (DE) ........................ 10 2010 012 049

(51) Int. Cl.

*A01F 7/00* (2006.01)
*A01D 41/00* (2006.01)
*A01D 43/063* (2006.01)
*A01F 12/40* (2006.01)
*A01F 25/18* (2006.01)
*A01F 25/14* (2006.01)

(52) U.S. Cl.

CPC ............ *A01D 41/00* (2013.01); *A01D 43/0633* (2013.01); *A01F 12/40* (2013.01); *A01F 25/183* (2013.01); *A01F 2025/145* (2013.01)
USPC ............................ 460/149; 460/111; 56/14.6

(58) Field of Classification Search

USPC ........... 460/97, 100, 111, 112, 114, 115, 119, 460/149, 905; 56/14.6
See application file for complete search history.

(56) References Cited

U.S. PATENT DOCUMENTS 1,831,216 A * 11/1931 Wickersham ................. 460/100
5,519,987 A * 5/1996 Voss et al. ...................... 56/14.6
5,830,061 A * 11/1998 Voss et al. ....................... 460/70

FOREIGN PATENT DOCUMENTS

CA 2 180 691 C 11/1998
EP 1 902 611 A2 3/2008
WO WO 2006/074667 A2 7/2006

OTHER PUBLICATIONS

International Search Report dated Sep. 29, 2011.
International Preliminary Report on Patentability regarding PCT/DE2011/000281 application dated Sep. 25, 2012.

* cited by examiner

*Primary Examiner* — Alicia Torres
(74) *Attorney, Agent, or Firm* — Cohen & Hildebrand, PLLC

(57) ABSTRACT

A method and device for harvesting threshed crops including a threshing assembly (3) arranged downstream of a cutting assembly (2) of a combine harvester (1) for separating the grain-chaff mixture (12) from the straw. A chaffing device (4) is arranged downstream of the threshing assembly (3) for separating the total straw fraction into a first and a second straw fraction (5.1, 5.2). A comminution device (8) is arranged downstream of the chaffing device (5) for comminuting the second straw fraction (5.2). A blower (10) having a suction pipe (9) draws in and mixes the grain-chaff mixture (12) and the second straw fraction (5.2) to form a mixture (18) of grain, chaff, and second straw fraction and conveys the mixture (18) into a silo (14).

9 Claims, 2 Drawing Sheets

METHOD AND DEVICE FOR HARVESTING THRESHED CROPS

This is an application filed under 35 USC §371 of PCT/DE2011/000281 on Mar. 18, 2011, claiming priority to DE 10 2010 012 049.9 filed on Mar. 19, 2010.

BACKGROUND OF THE INVENTION

The invention relates to a method for harvesting threshed crops according to the preamble of claim 1. The invention also includes a device for harvesting threshed crops.

Within the context of the invention, the term harvest includes all those method steps necessary for harvesting agricultural plants and crops. The threshed crops, in particular grain crops in form of grain, are composed substantially of grain, chaff and straw.

While the straw and the grain are supplied to their conventional use, the recovery of chaff as a material component of the cereal crop has decreased in importance in Europe. Even with the use of stationary automatic combine harvesters, the chaff was part of the harvest of the entire plant and could be captured and used separately. When the threshing operation was moved from the farm to the field through the use of mobile combine harvesters, this could initially still be mastered at low travel speeds and small cutting assembly widths with chaff bags and later with changeable chaff vehicles coupled to the combine harvester. The very high-volume chaff production with the introduction of the combine harvesters eliminated the recovery, in particular from the mid-1960s on, because the transfer to parallel moving high-volume trailers was inefficient. There is presently the problem in that modern combine harvesters can distribute the chaff uniformly across the cutting width only through additional energy consumption.

DE 35 44 157 C1 discloses a device for combine harvesters for distributing the chaff. The device consists of rotating blades and of a support frame with a rear cover plate in which two rotors with at least two turbine-like blades driven in opposite directions are supported next to each other for rotation about mutually parallel axes, wherein the frame can be movably guided on two supports and locked in position. The invention is characterized in that the supports are tiltably supported at one end on sleds which are adjustably guided in rails connected with the combine harvester, and that the other ends of the supports can be fixed in different tilt positions.

DE 28 37 814 A1 discloses a combine harvester for harvesting grain at the front end of the combine harvester, threshing the harvested grain and discharging the straw and the chaff from a straw shaker or a screen disposed at the rear end of the combine harvester. This invention is characterized in that a collection hopper is provided for receiving the straw or the chaff, with a conveyor belt discharging the straw and the chaff at a certain distance from the collection hopper being pivotally arranged at the output end of the collection hopper.

U.S. Pat. No. 7,651,391 B2 describes a method and a device for directly recovering biomass produced during threshing in the field.

Furthermore, a superstructure silo arranged at the rear end of the combine harvester for receiving chaff has been disclosed by the company Thierart, 08300 Le Châtelet-sur-Retourne, France. The silo which consists of low-weight canvas attains a volume of up to 16 $m^3$. However, because of the different required transfer and transport solutions for grain and chaff, the attainable throughput capacity of the combine harvester designed for grain harvest is reduced. The solution is suitable for a locally important demand for feed chaff in limited transport quantities and also for smaller acreage with less time pressure in the harvesting technology.

Another solution described in CA 2,180,691 A is the common capture of grain and chaff in a combine harvester silo without cleaning device. This solution is not suitable for high yields. Additional costs are incurred for transport, without being able to eliminate the recovery of straw which is also required.

The aforedescribed conventional solutions disadvantageously do not or only inadequately satisfy the many economic aspects for recovering the pure chaff fraction.

It is desirable since some time to use the chaff having high energy content—in addition to the straw and the grain—as biomass. The by about 50% lower nitrogen content of the chaff compared to that of the grain results in reduced nitrogen emission during combustion. In addition, the chaff has a lower potassium and chlorine content than straw, which results in reduced particle emissions and reduced slag formation in the ash. It should also be mentioned in this context that the chaff is suitable both as bedding due to its high absorption capability and as a feed additive due to its high feed value.

BRIEF SUMMARY OF THE INVENTION

It is therefore an object of the invention to propose a method for harvesting threshed crops which allows efficient recovery of the energy-containing chaff for further use by taking into account a sustainable production of the agricultural land. It is another object of the invention to construct a corresponding device for recovering the chaff.

According to the concept of the invention, the method for harvesting threshed crops includes the method steps cutting and receiving the threshed crops, threshing and separating the grain-chaff-mixture from the straw, and conveying the grain-chaff-mixture into a silo. The silo may be the silo of a combine harvester as well as the silo of a trailer of the combine harvester. According to the invention, the method steps chaffing the straw and separation into a first and a second straw fraction, putting the first straw fraction down on the field, comminuting the second straw fraction and transferring the second straw fraction into a silo, and transferring the mixture of grain, chaff and second straw fraction to a transport vehicle. Optionally, after the threshing and separating the grain and the chaff from the straw, a cleaning step may follow.

Preferably, the fraction of the first straw fraction remaining on the field is between 70% to 95%, particularly preferred 75%, and the fraction of the fraction of the second straw fraction transferred into the silo is between 5% to 30%, particularly preferred 25%, of the total straw fraction. The first straw fraction is thereby expelled onto the field uniformly across the width of the cutting assembly. The second straw fraction which does not remain on the field corresponds to the quantity of straw that is not required each year for a balanced humus balance of the soil. However, the aforementioned fraction of the first straw fraction between 70% and 90%, particularly preferred 75%, of the total straw fraction is not static, but can be variably adjusted with a chaffing device depending on the desired use of the mixture from grain, chaff and second straw fraction.

The two possibilities exist to, on one hand, separate the mixture of grain, chaff and second straw fraction in the silo in a processing plant, whereby grain and chaff and the second straw fraction are separately collected and further processed. On the other hand, the mixture of grain, chaff and second straw fraction can be conveyed as an un-separated mixture to additional method steps. The mixture of grain, chaff and second straw fraction can be temporality deposited in a pile on the field, and can then be conveyed, if necessary, to further processing at a later time.

It has been proven to be particularly advantageous if the silo mixture of grain, chaff and second straw fraction is compacted in the silo with a compacting device. With this measure, the silo of the combine harvester can accept a larger quantity of the mixture and the method for harvesting the threshed crops can be designed more efficiently. When depositing the mixture in a pile at the edge of the field, the demands for covering the pile are very low. The straw contained in the mixture as the second straw fraction and the chaff provide adequate protection against overheating, cold and wetness.

According to the invention, the device for harvesting threshed crops using a combine harvester includes a threshing device arranged downstream of the combine harvester for separating a grain-chaff mixture from straw, a chaffing assembly arranged downstream of the threshing device with a connected separation device for separating the entire straw fraction into a first and a second straw fraction, a comminution device arranged downstream of the separation device for comminuting the second straw fraction, and a blower for conveying the mixture of grain, chaff and second straw fraction into the silo. The second straw fraction is comminuted in the comminution device into straw pieces with a size between 0.5 cm and 2 cm. With this size range of the straw pieces, the storage volume of the silo is optimally used, because a mixture of grain, chaff and second straw fraction can be particularly efficiently and effectively compacted with this size of the straw pieces and, on the other hand, for example the mixture of grain, chaff and second straw fraction deposited in a pile is sufficiently protected against overheating, cold and wetness.

It has proven to be particularly advantageous in this context to construct the comminution device as a hammer mill.

In a particularly preferred embodiment of the invention, the comminution device and the blower have a common drive shaft. The resulting compact structure requires only a small installation space and hence only short supply paths for the second straw fraction and the grain-chaff mixture. This structural design can be implemented with only four main shafts, eight large shaft bearings and three hydraulic drives even if the threshing system is constructed with two rotors.

According to the invention, the silo includes a movable bulkhead for compacting the mixture of grain, chaff and second straw fraction. In addition, a film tube press arranged inside or outside the silo may be provided which can be used for portioning and depositing the mixture of grain, chaff and second straw fraction in the film tube sections. For this purpose, the rear tailgate of the silo may be formed as a film tube press in form of a helical screw pipe conveyor. The helical screw pipe conveyor includes a short pipe jacket with two ends which are supported by inclined rollers and associated guideways for absorbing the axial forces. The helical screw pipe conveyor is equipped with a rotary drive with a flat belt encompassing the pipe jacket and is driven by a hydraulic motor, wherein the required axial pressing force is generated by the bulkhead and rotation of the helical screw moves the mixture of grain, chaff and second straw fraction predominantly to prevent interior and exterior fraction and bridge formation. The web height of the helical screw connected with the inside of the pipe jacket hereby increases from the silo and is constructed so as to essentially form the rear retaining wall of the silo when the pipe jacket is at rest.

The significant advantages and features of the invention compared to the state-of-the-art are essentially:

- an integrated crop-threshing method with only a single passage across a field for harvesting grain, chaff and a straw fraction, wherein only the quantity of straw is removed from the field which can be justified for a desired humus balance, and thereby only a single passage across the field is required for transporting the mixture of grain, chaff and second straw fraction to be harvested,
- chaffing the straw and separating the straw into a first and a second straw fraction, wherein the first straw fraction is ejected again and distributed on the field and the second straw fraction is collected together with the grain and the chaff as mixture in the silo,
- the mixture of grain, chaff and second straw fraction can be temporally stored at the edge of the field, without requiring additional protective measures against overheating, cold and wetness, thereby optimizing the harvesting operation,
- the mixture of grain, chaff and second straw fraction may be separated either in a processing plant, whereby grain and chaff as well as the second straw fraction are separated and further processed, or may be conveyed as a mixture of grain, chaff and second straw fraction to subsequent method steps,
- as subsequent method step, the production of biomass products, such as for example pellets, biogas or feed, is possible,
- the comminution of the second straw fraction on the combine harvester with a comminution device preferably implemented as a hammer mill enables effective use of the loading capacity of the silo, and
- the rear tailgate of the silo may optionally be constructed as a film tube press for portioning and depositing the mixture of grain, chaff and second straw fraction.

The objects and advantages of the invention will be better appreciated and evaluated after a careful study of the following extensive description of the presently preferred, but not limiting, exemplary embodiments of the invention with the appended drawings, which show in:

DETAILED DESCRIPTION OF THE INVENTION

Figure 1:
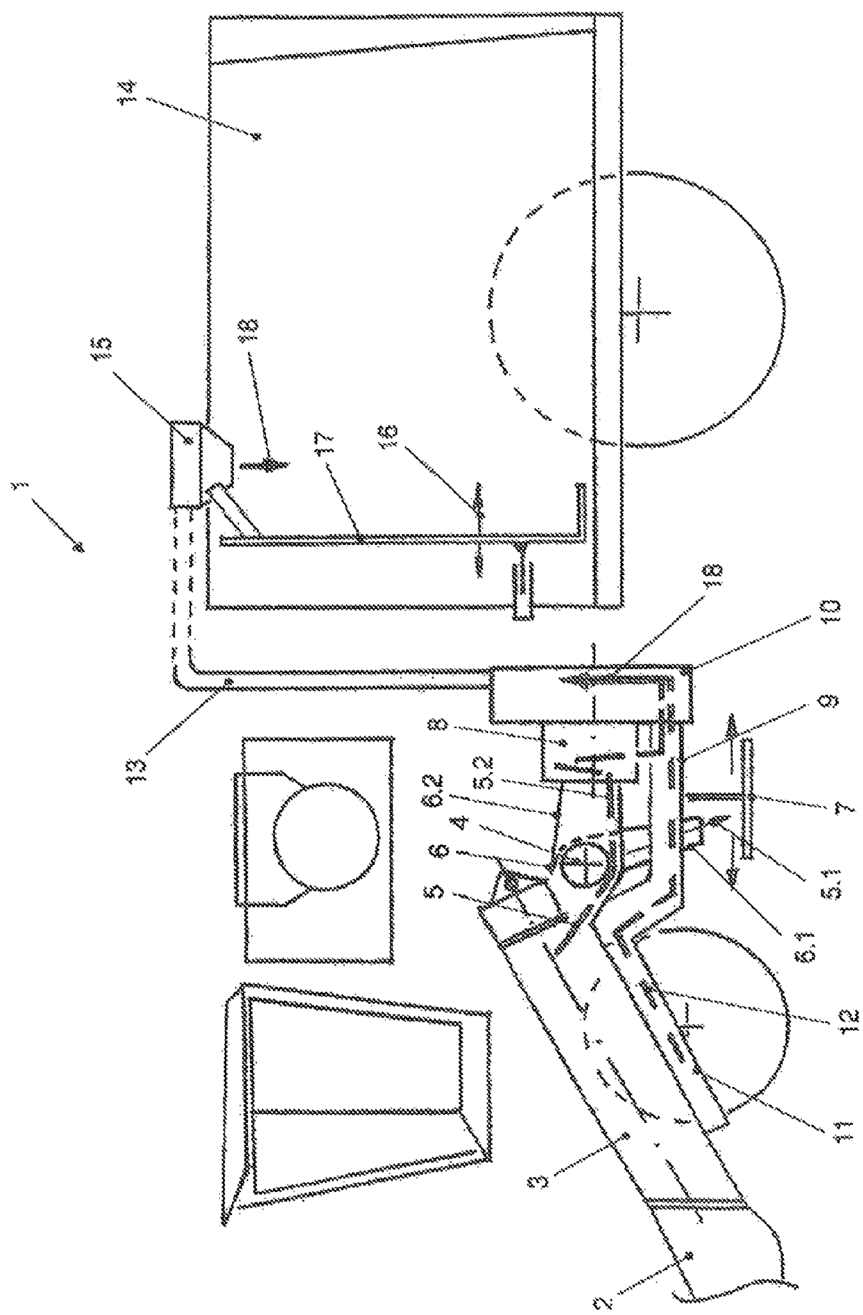
FIG. 1 a schematic diagram of a combine harvester according to the invention, and FIG. 2 a schematic diagram of a silo with a film tube press.

FIG. 1 shows a schematic diagram of a combine harvester 1 according to the invention. The combine harvester 1 includes a threshing assembly 3 extending to a cutting assembly 2 and operating according to the axial flow principle. A chaffing device 4 with a housing 6 for separating the chaffed total straw fraction 5 into a first and a second straw fraction 5.1, 5.2 is arranged downstream of the threshing assembly 3. The housing 6 has a pipe section 6.1 for conveying the first straw fraction 5.1 to a distribution device 7 for depositing the first straw fraction 5.1 on the field, and a short slideway 6.2 for conveying the second straw fraction to a comminution device 8 constructed as a hammer mill. The outlet of the comminution device opens into a suction pipe 9 of a blower 10. A catch device 11 for catching the grain-chaff mixture 12 is arranged underneath the threshing assembly 3. The outlet of the catch device 11 also opens into the suction pipe 9 of the blower 10. A pipe 13 extends from the blower 10 to a cyclone 15 arranged above the silo 14. A bulkhead 17 which is movable in the direction of the arrow 16 is arranged inside the silo 14, with the cyclone 15 attached to the upper end of the bulkhead 17.

The grain cut with the cutting assembly 2 is threshed in the threshing assembly 3 and separated into a total straw fraction 5 and a grain-chaff mixture 12. The total straw fraction 5 is supplied to a chaffing device 4 where it is chaffed and separated into a first straw fraction 5.1 and a second straw fraction 5.2. The fraction of the first straw fraction 5.1 is here between 70% to 95%, preferably 75%, and the fraction of the second straw fraction 5.2 is between 5% and 30%, preferably 25%, of the total straw fraction 5. The first straw fraction 5.1 is transported via the pipe section 6.1 of the housing 6 to the distribution device 7 and then distributed on the field. The second straw fraction 5.2 is supplied via the short slideway 6.2 to the comminution device 8, where it is comminuted into pieces with a size between 0.5 cm and 2.0 cm, and then arrives at the suction pipe 9 of the blower 10. The grain-chaff mixture 12 also reaches the suction pipe 9 of the blower 10 via the catch device 11, where it is mixed with the comminuted second straw fraction 5.2 to a mixture 18 of grain, chaff and second straw fraction. The mixture 18 of grain, chaff and second straw fraction is conveyed with the blower 10 through the pipe 13 to the cyclone 15. The mixture 18 of grain, chaff and second straw fraction is introduced into the silo 14 with the cyclone 15. The bulkhead 17 can be cyclically moved back and forth in the direction of the arrow 16, causing the mixture 18 of grain, chaff and second straw fraction in the silo 14 to be compacted. It has been observed that due to the comminution of the second straw fraction 5.2 into pieces having a size between 0.5 cm and 2.0 cm, the mixture 18 of grain, chaff and second straw fraction can be very efficiently and optimally compacted in the silo 14 with low energy consumption. Under the assumption of a total straw fraction of 6 t/ha, about 1.5 t/ha straw as the second straw fraction 5.2 and about 1.5 t/ha chaff can be proportionately harvested and collected.

With a combine harvester 1 described above, the volume of the silo 14 can be increased approximately threefold compared to a conventional combine harvester of the same size. In this way, the quantity of the mixture 18 of grain, chaff and second straw fraction to be harvested and collected with the method of the invention from one ha farm field can be housed by the silo 14 of the combine harvester 1 according to the invention.

Figure 2:
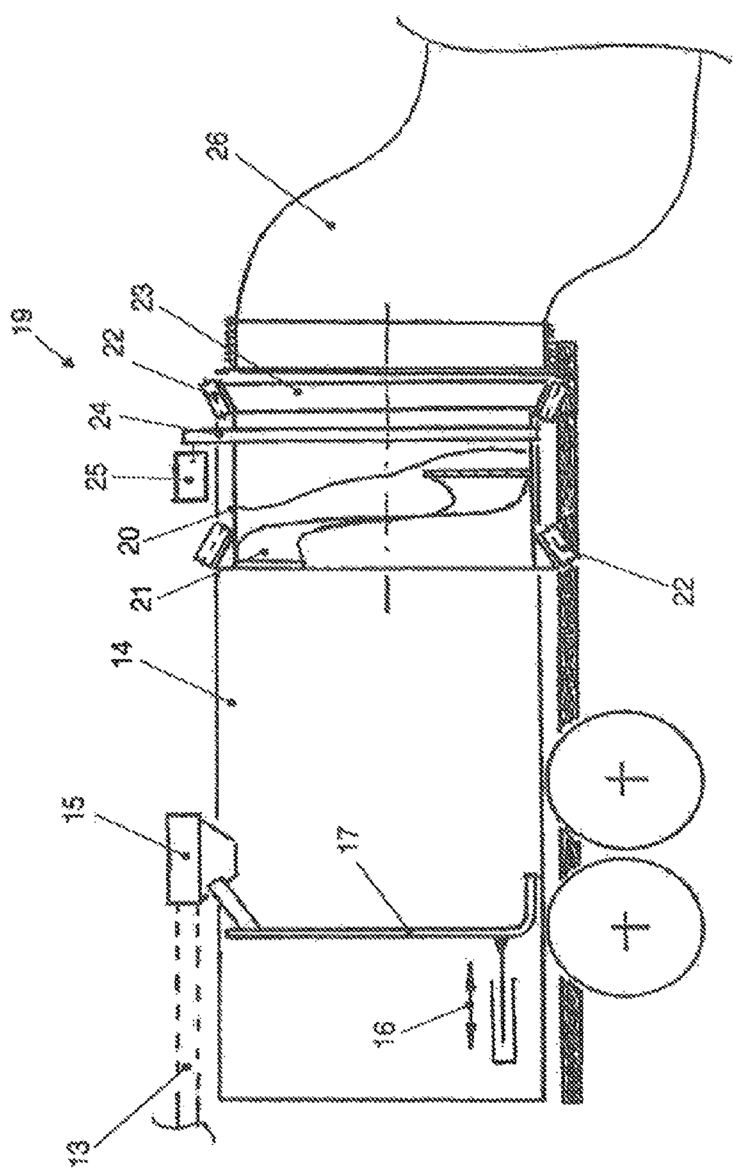

FIG. 2 shows schematically the arrangement of a film tube press 19 disposed on the rear wall of the silo 14. The film tube press 19 is constructed as a helical screw pipe conveyor and has a rotatably arranged pipe jacket 20 with an interior helical screw 21. Rubberized rollers 22 contacting the pipe jacket 20 are arranged for supporting the pipe jacket 20 and distributed about the circumference of the pipe jacket 20 with a spacing of 180°. These rollers 22 also absorb axial forces due to suitable inclination in uncomplicated guideways 23. The pipe jacket 20 is driven with a flat belt 24 encompassing the circumference of the pipe jacket 20 by a motor 25 constructed as a hydraulic motor. This motor is essentially designed only for moving the mixture 18 to prevent bridge formation. The mixture 18 of grain, chaff and second straw fraction is pressed into a foil tube 26 by moving the bulkhead 17 towards the film tube press 19. The film tube filled with the mixture 18 of grain, chaff and second straw fraction is deposited on the field.

LIST OF USED REFERENCE SYMBOLS

1 Combine Harvester
2 Cutting assembly
3 Threshing assembly
4 Chaffing device
5 Total straw fraction
5.1 First straw fraction
5.2 Second straw fraction
6 Housing
6.1 Pipe section
6.2 Short slideway
7 Distribution device
8 Comminution device, hammer mill
9 Suction pipe
10 Blower
11 Catch device
12 Grain-chaff-mixture
13 Pipe
14 Silo
15 Cyclone
16 Arrow
17 Bulkhead
18 Mixture of grain, chaff and second straw fraction
19 Film tube press
20 Pipe jacket
21 Helical screw
22 Roller
23 Guideway
24 Flat belt
25 Motor
26 Film tube

The invention claimed is:

1. A method for harvesting crops, comprising the following steps:

a) cutting and receiving the crops,
b) threshing and separating a grain-chaff-mixture from a total straw fraction,
c) cutting the total straw fraction (5) and separating the cut total straw fraction into a first straw fraction and a second straw fraction,
d) putting the first straw fraction down on a field,
e) comminuting the second straw fraction,
f) mixing the second straw fraction and the grain-chaff-mixture to a mixture made of grain, chaff and second straw fraction; and transferring the mixture into a silo, and
g) transferring the mixture of grain, chaff and second straw fraction from the silo to a transport vehicle or putting the mixture of grain, chaff and second straw fraction down on the field.

2. The method according to claim 1, wherein the fraction of the first straw fraction remaining on the field is between 70% and 95%, and the fraction of the second straw fraction transferred into the silo is between 5% to 30% of the total straw fraction.

3. The method according to claim 1, wherein the mixture of grain, chaff and second straw fraction is compacted in the silo.

4. The method according to claim 1, wherein the mixture of grain, chaff and second straw fraction from the silo is put down on the field either in a stack or in a film tube.

5. A combine harvester for harvesting crops, comprising:

a) a threshing assembly arranged downstream of a cutting assembly of the combine harvester for separating a grain-chaff mixture from a total straw fraction,
b) a device arranged downstream of the threshing assembly for separating the total straw fraction into a first straw fraction and a second straw fraction, c) a comminution device arranged downstream of the device for separating the total straw fraction; the comminution device used for comminuting the second straw fraction, d) a blower having a suction pipe for drawing in and mixing the grain-chaff mixture and the second straw fraction to form a mixture of grain, chaff, and second straw fraction; and for conveying the mixture into a silo, and e) a distribution device for putting the first straw fraction down on a field.

6. The combine harvester according to claim 5, wherein the comminution device is constructed as a hammer mill and has a common driveshaft with the blower.

7. The combine harvester according to claim 5, wherein the silo comprises a steerable bulkhead, with which the mixture of grain, chaff and second straw fraction is compacted.

8. The combine harvester according to claim 5, wherein a film tube press is provided inside or outside the silo.

9. The method according to claim 2, wherein the fraction of the first straw fraction remaining on the field is between 75% and 95% and the fraction of the fraction of the second straw fraction transferred into the silo is between 5% to 25% of the total straw fraction.

* * * * *